United States Patent [19]

Hugo et al.

[11] Patent Number: 5,505,008
[45] Date of Patent: Apr. 9, 1996

[54] METHOD FOR RECYCLING MATERIALS CONTAINING PLASTIC, RUBBER OR LACQUER

[75] Inventors: Franz Hugo, Aschaffenburg; Helmut Teuschel, Offenbach; Erwin Wanetzky, Grosskrotzenburg, all of Germany

[73] Assignee: Leybold Durferrit GmbH, Cologne, Germany

[21] Appl. No.: 264,725

[22] Filed: Jun. 23, 1994

[30] Foreign Application Priority Data

Jun. 29, 1993 [DE] Germany .......... 43 21 641.2
May 27, 1994 [DE] Germany .......... 44 18 562.6

[51] Int. Cl.⁶ ............................. F26B 5/04
[52] U.S. Cl. ...................... 34/403; 34/408
[58] Field of Search ............... 34/92, 402, 403, 34/406, 407, 408, 412, 386; 110/236

[56] References Cited

U.S. PATENT DOCUMENTS

| | | | |
|---|---|---|---|
| 3,823,223 | 7/1974 | Liska et al. | 423/445 |
| 3,904,483 | 9/1975 | Kurihara et al. | 196/116 |
| 4,175,211 | 11/1979 | Chen et al. | 585/241 |
| 4,235,676 | 11/1980 | Chambers | 202/118 |
| 4,740,270 | 4/1988 | Roy | 201/35 |
| 4,871,426 | 10/1989 | Lechert et al. | 201/2.5 |
| 5,095,040 | 3/1992 | Ledford | 521/40.5 |
| 5,103,578 | 4/1992 | Rickard | 34/406 X |
| 5,158,983 | 10/1992 | Stapp | 521/41 |
| 5,170,725 | 12/1992 | Sass et al. | 110/236 |
| 5,198,018 | 3/1993 | Agarwal | 75/401 |
| 5,352,250 | 10/1994 | Geke et al. | 34/406 X |

FOREIGN PATENT DOCUMENTS

| | | | |
|---|---|---|---|
| 1228586 | 9/1989 | Japan | 110/344 |
| 1441997 | 7/1976 | United Kingdom . | |
| 1494300 | 12/1977 | United Kingdom . | |
| 1507138 | 4/1978 | United Kingdom . | |
| 1562372 | 3/1980 | United Kingdom . | |
| 2228493 | 8/1990 | United Kingdom . | |
| 9300449 | 1/1993 | WIPO . | |
| 9312198 | 6/1993 | WIPO . | |

OTHER PUBLICATIONS

Bikle, Don: Now: Remove Plastic Deposits from Extruder Parts the Modern Way. In: SPE Journal, Jul. 1973, vol. 29, S.25–27.

Primary Examiner—Henry A. Bennett
Assistant Examiner—Susanne C. Tinker
Attorney, Agent, or Firm—Felfe & Lynch

[57] ABSTRACT

Material containing organic substances including rubber, plastic, and lacquer is heated in a vacuum process chamber at subatmospheric pressure in a nonreactive atmosphere to a temperature of at least 200° C., the gases and vapors thus formed are condensed in a condensate separator, and the condensate is captured and made available for reuse or disposal. The embrittled residues formed from these substances are crushed and the crushed residues are collected and made available for recycling or disposal. If metals are contained in the material, the residues are loosened, collected, and crushed. The process and the apparatus are suitable for recycling insulted wire, metal bonded to rubber, plastic containers decorated with pigments, motor vehicle steering wheels, workpiece hangers and tools coated with lacquer, poorly lacquered metal parts, tires and rubber pads of track-laying vehicles, and seals.

9 Claims, 2 Drawing Sheets

PRESSURE COURSE

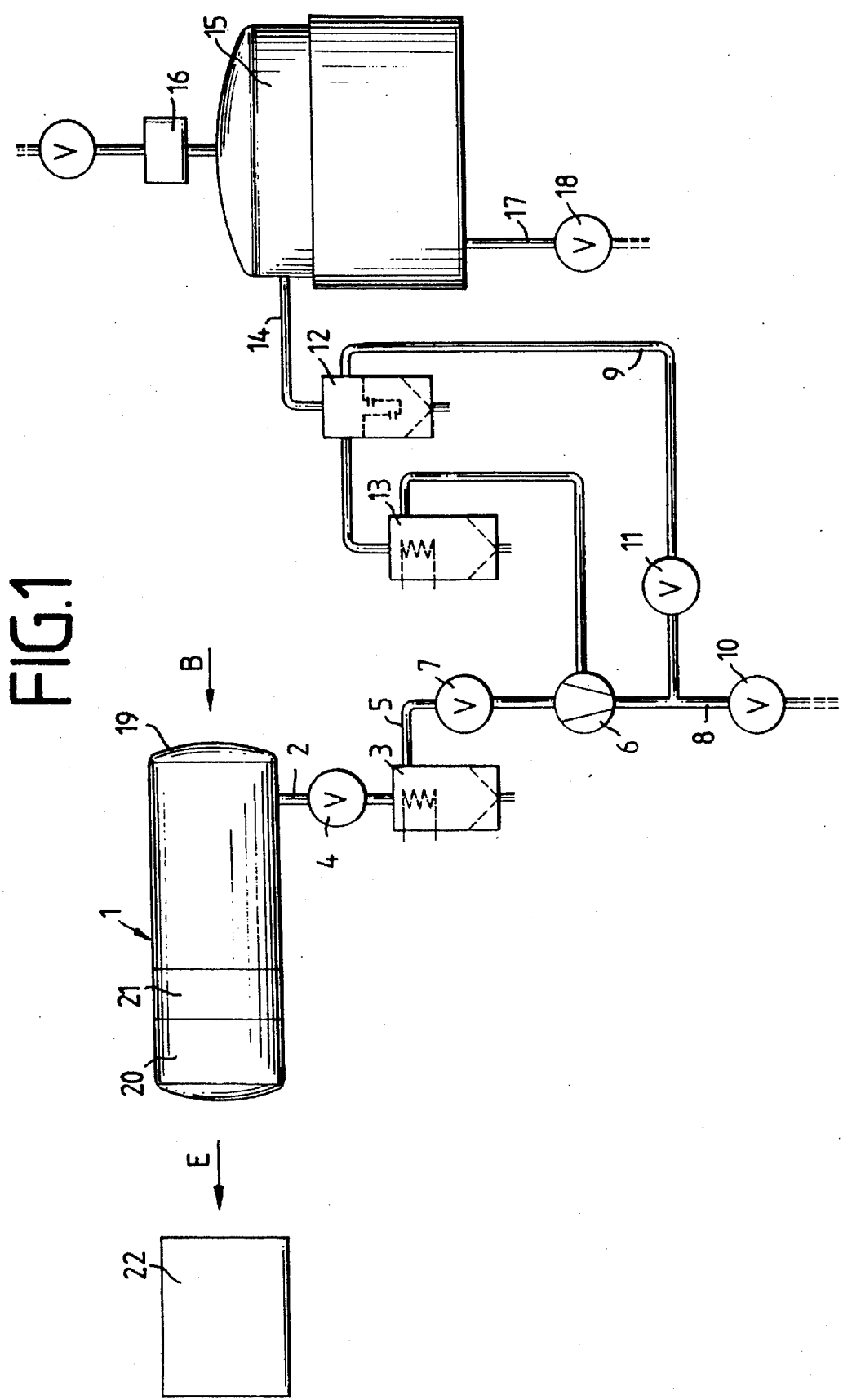

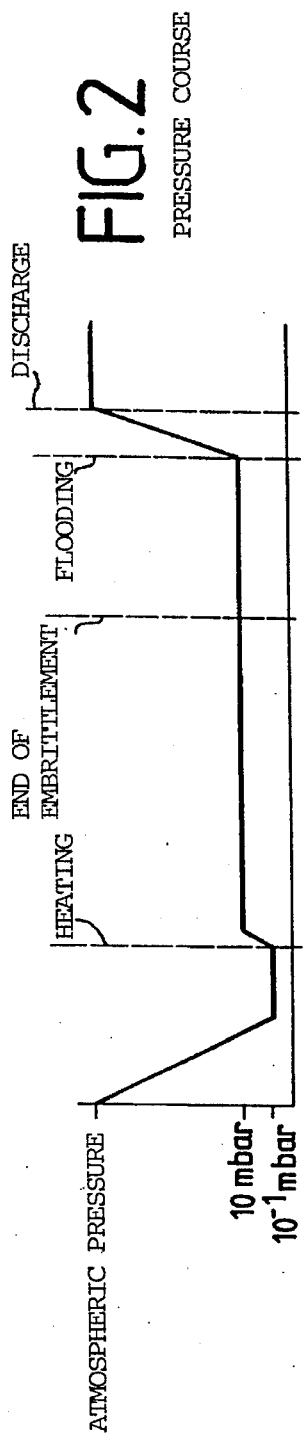
FIG.2 PRESSURE COURSE
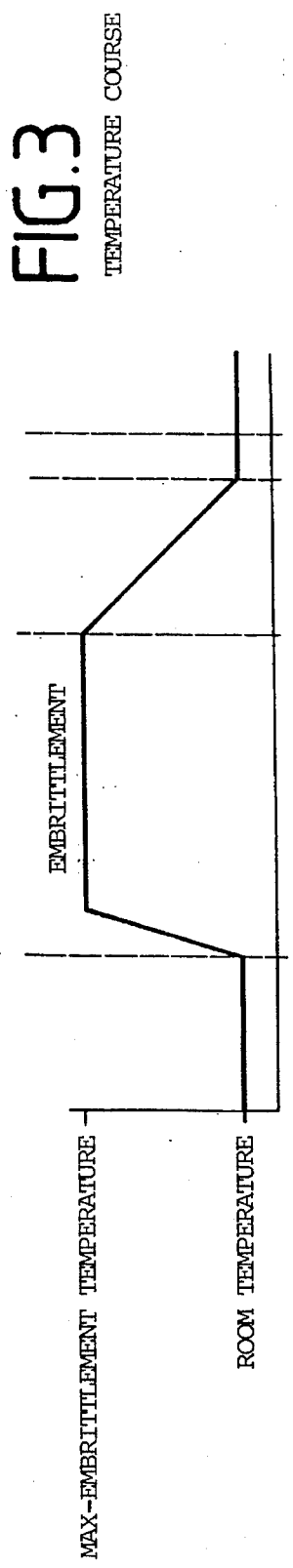
FIG.3 TEMPERATURE COURSE
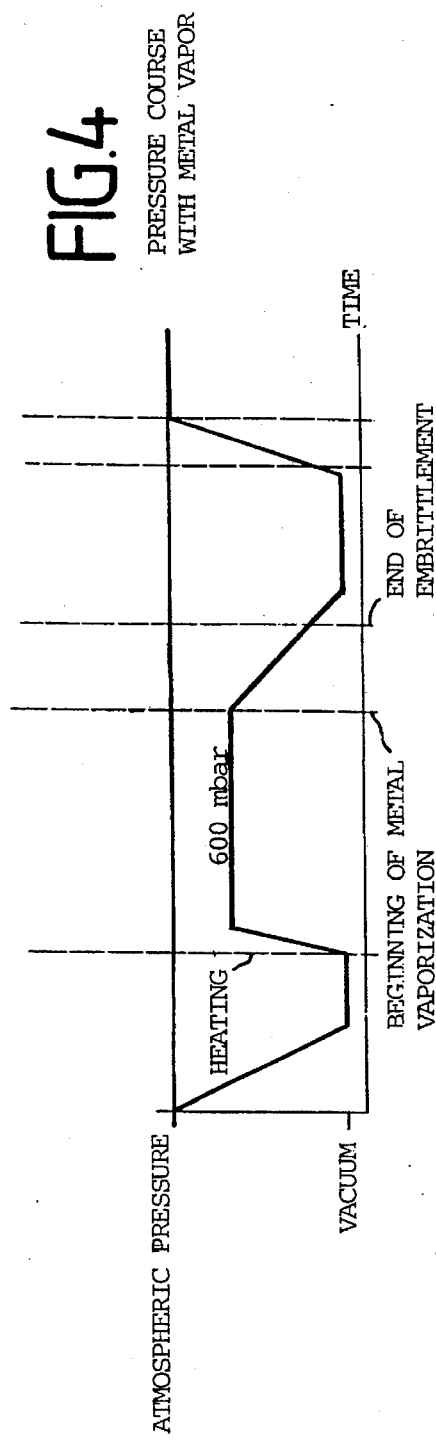
FIG.4 PRESSURE COURSE WITH METAL VAPOR ns. 5,505,008

METHOD FOR RECYCLING MATERIALS CONTAINING PLASTIC, RUBBER OR LACQUER

BACKGROUND OF THE INVENTION

The invention relates to a method for treating at elevated temperatures materials made of organic substances in the form of rubber, plastic and/or lacquers or provided with organic substances in the form of rubber, plastics or lacquers.

In the private as well as the industrial area, enormous wastes are produced of rubber, plastics and lacquers or components provided with these substances, which in whole or in part must be considered valuable substances and should be recycled. The recycling is becoming increasingly important for ecological reasons. The processes known heretofore are incineration and vacuum distillation. Neither process is free of problems, since some chlorine and sulfur compounds are released. Some of the rubber wastes contain metals provided with anticorrosives (zinc, for example) which are oxidized and issue in the form of air-borne dust. In incineration processes very large amounts of air are used, which has to be cleaned in large gas and dust filters.

It is known to use surplus old rubber tires, i.e., tires which can no longer be recapped, as fuel in cement kilns. In this case, however, nearly all the valuable substances are lost.

In an article by Theerkorn et al., entitled "Sauberer Wirbel," published in "Maschinenmarkt," Wüburg 98 (1992), pages 30 to 35, a disclosure is made of a method for cleaning metal parts by a reductive fluidbed process in aluminum oxide powder in the presence of nitrogen and hydrogen at temperatures between 350° and 1000° C., but preferably above 450° C. However, in addition to the metal parts gaseous substances are produced due to cracking and have to be cleaned and burned. It is even proposed to pass the waste gases through a second fluid bed at a higher temperature in order to comply with laws governing emissions. Temperatures of 950° C. are even mentioned for the prevention of dioxins and furans. Gasentrained aluminum oxide particles have to be captured in a centrifugal air separator. Degreasing is performed at temperatures between 350° and 460° C., and between 450° and 550° C. if the contamination is severe, for periods of time up to 60 minutes. Many parts, especially those made of aluminum alloys, do not withstand such thermal stress. Thin-walled pieces tend to warp.

It is furthermore known to perform the degreasing and stripping of components in a reactive low-pressure plasma excited by microwaves. This apparatus, however, is expensive, and the process involves great heat stress on the components.

It is furthermore known to strip metal parts of elastomers and other plastics by cryogenic methods by chilling the objects in liquid nitrogen to −196° C. thereby embrittling the plastics. The plastics that fall or are knocked off, however, have to be subjected to further processing.

No attention has been given to recycling processes for numerous valuable materials. For example, universal or CV joints on motor vehicles are guarded against dirt and dust by rubber-elastic bellows. These bellows serve a dual purpose in operation. First, they are a reservoir containing lubricant for the joint, and secondly they prevent the entry of water and abrasive dirt.

After a limited time of operation these bellows have to be replaced due to aging or also due to damage. This is done nearly always when the universal joint is replaced. The worn-out bellows are designated as problem trash. These bellows also turn up in car recycling operations with other components, such as oil seals, cap seals, O-rings or other seals.

Recycling or even disposal would be possible if the plastic or rubber were separated from the lubricants. Such separation has heretofore been accomplished by washing processes. Another method for the degreasing and deoiling of components containing plastic or rubber is the thermal vaporizing of the greases in a vacuum.

A process for this purpose is described in U.S. application Ser. No. 08/221,184, which describes a method for the degreasing and cleaning of material bearing grease and/or oily substances. According to this process the material to be cleaned is heated under vacuum conditions in a process chamber such that the greases and/or oils can be separated from the material according to their physical condition.

For any further use of the rubber parts thus degreased they have to be chopped up and ground. The grinding process is far more difficult than the degreasing, but it can be performed by freezing, with liquid nitrogen for example.

These known methods and apparatus have the disadvantage that, for example, even after combustion large amounts of solid and gaseous wastes are produced, which have to be disposed of separately or released to the atmosphere by burning. The gases released by combustion contain large amounts of metal oxides (e.g., oxides of zinc, cadmium, vanadium, arsenic etc.), some of which are highly toxic.

SUMMARY OF THE INVENTION

The invention is addressed to the problem of devising a method and an apparatus by which the amount of gas developing in recycling material made of or containing rubber, plastics or lacquers will be minimized and carried in a closed gas circuit, and both the gases and the metal solids that may be present in the material can be made available for reuse or disposal in an economically and ecologically acceptable manner.

This problem is solved according to the invention, in that the material is degreased and placed in a processing chamber which is partially evacuated, then is heated at a subatmospheric pressure in a nonreactive atmosphere to a temperature of at least 200° C., preferably above 250° C. The gases and vapors thus formed are condensed, and the condensate is captured and subjected to recycling or disposal. The embrittled residues formed from the organic substances are comminuted, and the comminuted residues are taken and made available for reuse or disposal.

Where metal components are contained in the material, it is advantageous if the residues formed from the organic substances are removed from them, collected, comminuted if necessary, and likewise made available for reuse or disposal.

Where vaporizable metal components are present, it is advantageous if they are vaporized, likewise condensed, and made available for recycling or disposal. In order to delay the vaporization of the vaporizable metal components, the pressure is first set below the atmospheric pressure but above the later treatment pressure.

Greasy and/or oily material should be degreased and/or deoiled in a preliminary cleaning step by heating at subatmospheric pressure and the grease and/or oils captured and made available for reuse or disposal, especially if the preliminary cleaning is performed at a lower temperature than the recycling temperature.

The process should be performed at a pressure no greater than 40 mbar, preferably no more than 10 mbar.

In processing material having metal components, the metal components freed from the residues can be recycled, When heating the material, the pressure is initially set at less than the atmospheric pressure, but above the later treatment pressure, and the condensation heat of the components first vaporized is used to heat cooler zones within the same batches.

The process according to the invention is suitable especially for the processing of the following materials wherein rubber, plastics, lacquer and enamels embrittle and fall or are knocked off and the components that become volatile in the embrittlement are distilled out:

Plastic- or rubber-covered electrical conductors, the conductor material (e.g. copper) remaining;

Solid metal parts bonded by rubber, especially vibration mounts, the solid parts (e.g. steel) remaining;

Plastic containers colored with pigments, especially from the group: yogurt cups, oil bottles and bags, the pigments remaining;

Automobile steering wheels with a metal core and a coating of organic material, the metal core remaining;

Airbag covers made of a metal and plastic sandwich, the metal remaining;

Hangers coated with lacquer from a lacquering production line, the hanger remaining;

Poorly enameled metal parts and plastic-coated hangers from electroplating baths, which remain;

Automobile tires with wire reinforcements having a coating of cadmium and/or zinc, the wire reinforcements remaining and low-boiling metals (e.g., protective coatings on the wire) being condensed;

Rubber pads from chains of track-laying vehicles, the metal bearing the pad remaining;

Plastic-coated tools, especially extrusion dies, the tools being recovered;

Sealing means, especially bellows, sealing rings, oil seals, O-rings and cap seals.

Distilled lubricants can then be processed and applied to another use. If the components thus cleaned remain in the vacuum processing chamber after degreasing and the process temperature is further increased, these originally flexible plastic or rubber parts lose their elasticity. The organic compounds are destroyed, and in the case of rubber a carbon structure remains. The easily vaporized metals (e.g., Zn, Cd) are precipitated in metallic form in the condenser. The metal condensate settles on the bottom of the condenser since it is of greater density than the oils. This carbon structure, free of vaporizable metals, can then be easily crushed or ground to powder. The sulfur, chlorine, fluorine and nitrogen compounds produced in the embrittling process can be neutralized by known methods and precipitated.

In contrast to conventional burning, substantially lesser amounts of gas need to be treated. At the same time this process can be a closed process, so that no gases can be unintentionally released to the ambient air. On the contrary, the gases collected in the gas tank can be determined by a gas analyzer and put to controlled further use or disposed of. Thus it is possible to connect the discharge side of the vacuum pump to a burner or a catalytic apparatus. Usable gases can be put into transportable bottles.

The embrittled rubber parts, ground to powder for example, can be used wherever carbon dust or granules are used and made into carbon or graphite semiproducts, or reprocessed in some cases to rubber products. Any nonmetallic distillation products can be recycled into new lubricants.

In one embodiment, oily rubber parts were heated first in a vacuum degreasing apparatus to 200° C. and then to 300° C. to embrittle them. The duration of the process of heating from 20° C. room temperature to 300° C. and then holding at 300° C. amounted to about 3 hours. Then the apparatus was shut off and allowed to cool down naturally. By this method and with this apparatus, plastic and rubber goods of any kind can be embrittled.

The invention also relates to an apparatus for the practice of the process. It is characterized by a heated vacuum process chamber connected by pipes with valves to at least one condensate separator and a vacuum pump.

In additional embodiments of the invention this apparatus can be characterized by the following features:

The vacuum pump is followed by a gas neutralizer.

A gas dryer is disposed in the pipe system.

A gas collecting tank is provided in the pipe system.

The vacuum processing chamber is configured as a pass-through apparatus with at least one airlock valve.

The vacuum processing chamber is followed by a cool-down chamber.

Between the vacuum processing chamber and the cool-down chamber an airlock is disposed.

A control valve is disposed in a pipe following the vacuum process chamber.

The condensate separator is configured as an oil vapor condenser.

The condensate separator is configured as a metal vapor condenser.

Between the vacuum pump and a discharge pipe following the vacuum pump a return pipe is disposed in which the gas neutralizer and/or the gas dryer are situated.

The gas collecting tank is followed by an apparatus for filling gas bottles.

The vacuum pump is followed by a burner for the combustion of the exhaust gases.

The vacuum pump is followed by a catalytic apparatus, especially a low-temperature catalyst.

BRIEF DESCRIPTION OF THE DRAWING

FIG. 1 is a diagrammatic representation of the components of a rubber-embrittling apparatus, FIG. 2 the pressure curve during an embrittlement process, FIG. 3 the temperature curve during an embrittling process, and FIG. 4 the pressure curve during an embrittling process with simultaneous metal vapor condensation.

DETAILED DESCRIPTION OF THE PREFERRED EMBODIMENT

An electrically heated or gas or oil fired processing chamber 1 is connected by a line 2 to a condensate separators. A shut-off valve 4 is provided in line 2. The separator 3 in turn communicates with a vacuum pump 6 through a vacuum line 5, in which a valve 7 is disposed in the vacuum line 5. The electrical heating of the process chamber and/or of the material can be performed capacitatively, inductively, by microwaves with direct or indirect coupling, or by heating resistances.

At the output end of the vacuum pump 6 are a discharge line 8 and a closed-circuit line 9, both of which can be controlled by the valves 10 and 11. In the closed-circuit line 9 a gas neutralizer 12 as well as a gas dryer 13 are provided. A line 14 is furthermore disposed on the neutralizer 12 connecting the neutralizer 12 to the gas tank 15.

On the gas tank 15 are a gas analyzer 16 and a discharge line 17 which can be shut off by means of the valve 18 and can be used, for example, for filling the gas into bottles.

The process chamber 1 is configured as an airlock chamber, so that the material to be treated is put in through a loading door 19 on one end of the chamber 1, and after the treatment has ended can be removed from chamber 1 through an unloading door 20 on the opposite end of the chamber. The unloading door 20 is separable from the treatment area of chamber 1 through an airlock 21. Alternatively, the vacuum process chamber 1 can also be operated batch-wise if it has only one loading door 19.

The process chamber 1 is adjoined in unloading direction E by a silo or a cooling apparatus 22 as an intermediate holding means for a grinding apparatus, not shown, in which the embrittled material is then mechanically crushed and in some cases compressed.

The next FIGS. 2, 3 and 4 show by way of example the curve of the pressure and temperature as a function of time within the process chamber 1 during an embrittling process.

After initially flexible, soft material has been brought into the chamber, first a vacuum of, for example, $10^{-1}$ mbar is produced beginning from atmospheric pressure (FIG. 2) and held constant for a short time. Then begins the heating, so that the chamber pressure increases slightly, for example to 10 mbar. This pressure remains virtually constant (assuming that the process chamber is continuously evacuated) beyond the end of the embrittling process up to the beginning of the flooding of the chamber. Thereafter the chamber pressure increases again to atmospheric pressure and the chamber can be opened and emptied.

The temperature curve (FIG. 3) remains constantly at room temperature up to the beginning of the heating process. Now the temperature is quickly raised to the embrittling temperature; this usually starts at 250° C. for workpieces of rubber that are to be treated, and runs to more than 400° C. If, however, the workpieces to be embrittled do not consist exclusively of rubber, plastic or the like, but metal inserts are still present in the workpieces and have a coating of easily vaporizable metals such as cadmium and/or zinc, as in the case, for example, of steel-belted tires, the process temperature must be above the vaporization temperature of the metal in question. This will be at least 320° C. for cadmium, for example, and at least 400° C., at a vacuum lower than $10^{-1}$ mbar in each case.

After the embrittling has ended the charge is removed through the airlock or the chamber temperature cools down to room temperature and at this temperature the chamber is flooded and emptied.

In comparison to the pressure curve shown in FIG. 2, the pressure assumes a different curve (FIG. 4) if during the embrittlement metal is also vaporized out of the material, as previously mentioned in regard to the temperature curve in FIG. 3. Here the pressure varies (during the actual embrittlement) due to the fact that the process chamber is closed when heating begins and is not further pumped down. Thus the chamber pressure rises to a level that can be below the atmospheric pressure but above the actual treatment pressure, for example at about 600 mbar. When the metal vaporization begins the vacuum line to the chamber is reopened, the chamber is more greatly evacuated, and the pressure is lowered to its minimum level until after the end of the embrittlement. After the chamber is completely evacuated, the vacuum pressure continues to be held for a short period of time, and then the chamber is flooded and emptied.

We claim:

1. Process for the recycling of materials containing organic substances, said process comprising the following steps:

placing said materials in a process chamber, maintaining a non-reactive atmosphere in said process chamber, reducing the pressure in said process chamber to a treatment pressure in the range of $10^{-1}$ mbar to 40 mbar, heating the material to a temperature of at least 200° C. while maintaining a non-reactive atmosphere at the treatment pressure, thereby forming gases and vapors of said organic materials and leaving embrittled residues, evacuating said gases and vapors so that said treatment pressure is maintained during heating, condensing said gases and vapors to form a condensate, and crushing said embrittled residues.

2. Process as in claim 1 wherein said materials contain metal and organic substances, said process further comprising separating the embrittled residue from the metal, and collecting the metal for reuse and disposal.

3. Process as in claim 2 wherein said metal comprises vaporizable components, said process further comprising vaporizing said components to form metal vapors, and condensing said metal vapors.

4. Process as in claim 3 wherein during heating said pressure is initially maintained above the treatment pressure until metal vapors are formed, then reduced to the treatment pressure, thereby delaying vaporization of of said organic materials until said pressure is reduced to the treatment pressure.

5. Process as in claim 3 wherein said materials are heated to a temperature above the vaporization temperature of the vaporizable metal components.

6. Process as in claim 1 wherein said material contains plastic and pigments, said material being heated to a temperature of at least 250° C.

7. Process as in claim 1 wherein said organic substances include at least one of rubber, plastic, and lacquer.

8. Process as in claim 1 wherein the pressure in the process chamber is lowered to less than the treatment pressure prior to heating, whereby said gases and vapors formed during heating raise the pressure to the treatment pressure.

9. Process as in claim 1 wherein said treatment pressure in the range of $10^{-1}$ mbar to 10 mbar.

* * * * *

UNITED STATES PATENT AND TRADEMARK OFFICE
CERTIFICATE OF CORRECTION

PATENT NO. : 5,505,008
DATED : April 9, 1996
INVENTOR(S) : Hugo et al.

It is certified that error appears in the above-identified patent and that said Letters Patent is hereby corrected as shown below:

In column 4, line 64 of the Patent, delete "separators" and insert

-- separator 3 --.

Signed and Sealed this

Fifth Day of May, 1998

*Attest:*

BRUCE LEHMAN

*Attesting Officer*   *Commissioner of Patents and Trademarks*